(12) United States Patent
Kushnar et al.

(10) Patent No.: US 9,722,399 B2
(45) Date of Patent: Aug. 1, 2017

(54) ELECTRICAL SYSTEM, AND CONNECTION DEVICE AND METHOD OF POWERING A SWITCHGEAR BUS IN AN ELECTRICAL SYSTEM

(71) Applicant: WESTINGHOUSE ELECTRIC COMPANY LLC, Cranberry Township, PA (US)

(72) Inventors: Philip M. Kushnar, Apollo, PA (US); Kenneth M. Fabrizi, Delmont, PA (US); Daniel L. Herman, Connellsville, PA (US); Jason W. Thornton, Greensburg, PA (US); Patrick J. Folmar, South Park, PA (US); William B. Van Wormer, Cranberry Township, PA (US)

(73) Assignee: Westinghouse Electric Company, LLC, Cranberry Township, PA (US)

(*) Notice: Subject to any disclaimer, the term of this patent is extended or adjusted under 35 U.S.C. 154(b) by 253 days.

(21) Appl. No.: 14/540,139

(22) Filed: Nov. 13, 2014

(65) Prior Publication Data

US 2016/0141845 A1    May 19, 2016

(51) Int. Cl.
| | |
|---|---|
| *H02B 1/42* | (2006.01) |
| *H02B 1/40* | (2006.01) |
| *H02B 13/00* | (2006.01) |
| *H02B 1/20* | (2006.01) |
| *H02B 1/04* | (2006.01) |

(52) U.S. Cl.
CPC ............ *H02B 1/40* (2013.01); *H02B 1/20* (2013.01); *H02B 13/00* (2013.01); *H02B 1/04* (2013.01)

(58) Field of Classification Search
None
See application file for complete search history.

(56) References Cited

U.S. PATENT DOCUMENTS

| | | | | |
|---|---|---|---|---|
| 4,033,660 A | * | 7/1977 | Ericson ................ | H02B 11/04 439/262 |
| 5,510,960 A | * | 4/1996 | Rosen ................ | H01R 9/2425 361/624 |
| 5,515,236 A | * | 5/1996 | Nolan .................... | H02B 1/21 174/68.2 |
| 5,574,612 A | * | 11/1996 | Pak ...................... | H01R 9/2491 361/115 |

(Continued)

*Primary Examiner* — Courtney Smith
(74) *Attorney, Agent, or Firm* — Eckert Seamans Cherin & Mellott, LLC (57) ABSTRACT

A connection device is for an electrical system. The electrical system has a powering apparatus, an electrical switching apparatus, and a switchgear bus. The electrical switching apparatus is coupled to the powering apparatus. The connection device includes: a mounting assembly having a panel and a support wall opposite the panel; an electrical transfer assembly including: a number of interconnect assemblies each having a load interconnect member, the load interconnect member being coupled to the panel and electrically connected to the powering apparatus; and a number of base assemblies each including: a number of stud members each coupled to the support wall. At least one of the number of stud members is electrically connected to the load interconnect member and electrically connected to the switchgear bus.

17 Claims, 9 Drawing Sheets

(56) References Cited

U.S. PATENT DOCUMENTS

| | | | | |
|---|---|---|---|---|
| 5,989,073 A * | 11/1999 | Kahoun | ............... | H01R 9/2491 |
| | | | | 439/651 |
| 6,242,702 B1 * | 6/2001 | Spiegel | .................. | H02B 11/02 |
| | | | | 200/296 |
| 6,603,075 B1 * | 8/2003 | Soares | ..................... | H02B 1/21 |
| | | | | 174/149 B |
| 7,646,271 B2 * | 1/2010 | Gottschalk | ........... | H01H 9/0264 |
| | | | | 200/50.32 |
| 9,373,946 B2 * | 6/2016 | Bruchmann | ............. | H02G 5/00 |
| 9,515,463 B2 * | 12/2016 | Krause | ................... | H02B 11/26 |
| 2007/0111575 A1 * | 5/2007 | Jensen | ............... | H01R 13/6315 |
| | | | | 439/246 |
| 2013/0258558 A1 * | 10/2013 | Rusch | ..................... | H02B 1/21 |
| | | | | 361/634 |
| 2015/0372460 A1 * | 12/2015 | Faber | ...................... | H01H 9/22 |
| | | | | 361/611 |

\* cited by examiner

ELECTRICAL SYSTEM, AND CONNECTION DEVICE AND METHOD OF POWERING A SWITCHGEAR BUS IN AN ELECTRICAL SYSTEM

BACKGROUND

Field

The disclosed concept pertains generally to electrical systems and, more particularly, to electrical systems for nuclear reactors. The disclosed concept also pertains to connection devices for electrical systems. The disclosed concept further pertains to methods of powering a switchgear bus in an electrical system.

Background Information

In a nuclear reactor for power generation, such as a pressurized water reactor, heat is generated by fission of a nuclear fuel such as enriched uranium, and transferred to a pressurized coolant in order to absorb the heat that is generated. The core contains elongated nuclear fuel rods mounted in proximity with one another in a fuel assembly structure, through and over which coolant flows.

A major concern with such nuclear reactors is maintaining cooling capability and electrical power at all times. Specifically, the reactors and associated fuel pools must be continually cooled. Electrical power is critical to ensuring this happens. This presents significant challenges during extreme emergency situations, such as natural disasters, which can disable multiple power and cooling systems at a reactor. For example, emergency generators may be flooded during a natural disaster, and other emergency equipment for the nuclear reactor may be damaged and/or unable to be accessed. In such a situation, there is a need to be able to maintain power in the nuclear reactor.

There is, therefore, room for improvement in electrical systems and in connection devices for electrical systems.

There is also room for improvement in methods of powering a switchgear bus in an electrical system therefor.

SUMMARY

These needs and others are met by the disclosed concept in which a connection device is employed to allow a powering apparatus to power a switchgear bus in an electrical system.

In accordance with one aspect of the disclosed concept, a connection device for an electrical system is provided. The electrical system includes a powering apparatus and a switchgear bus. The connection device comprises: a mounting assembly comprising a panel and a support wall opposite the panel; an electrical transfer assembly comprising: a number of interconnect assemblies each comprising a load interconnect member, the load interconnect member being coupled to the panel and structured to be electrically connected to the powering apparatus; and a number of base assemblies each comprising: a number of stud members each coupled to the support wall. At least one of the stud members is electrically connected to the load interconnect member and electrically connected to the switchgear bus.

As another aspect of the disclosed concept, an electrical system is provided. The electrical system comprises: a powering apparatus; a switchgear bus; and a connection device comprising: a mounting assembly comprising a panel and a support wall opposite the panel, an electrical transfer assembly comprising: a number of interconnect assemblies each comprising a load interconnect member, the load interconnect member being coupled to the panel and electrically connected to the powering apparatus, and a number of base assemblies each comprising: a number of stud members each coupled to the support wall. At least one of the stud members is electrically connected to each of the load interconnect member and the switchgear bus.

As another aspect of the disclosed concept, a method of powering a switchgear bus in an electrical system is provided. The method comprises the steps of: providing a powering apparatus; connecting a connection device to the powering apparatus, the connection device comprising at least one finger cluster apparatus; connecting the finger cluster apparatus to the switchgear bus; and turning the powering apparatus on in order to power the switchgear bus.

BRIEF DESCRIPTION OF THE DRAWINGS

A full understanding of the disclosed concept can be gained from the following description of the preferred embodiments when read in conjunction with the accompanying drawings in which.

DESCRIPTION OF THE PREFERRED EMBODIMENTS

As employed herein, the term "number" shall mean one or an integer greater than one (i.e., a plurality).

As employed herein, the statement that two or more parts are "coupled" together shall mean that the parts are joined together either directly or joined through one or more intermediate parts.

As employed herein, the statement that two or more parts or components "engage" one another shall mean that the parts touch and/or exert a force against one another either directly or through one or more intermediate parts or components.

As employed herein, the term "coupling member" refers to any suitable connecting or tightening mechanism expressly including, but not limited to, rivets, screws, bolts and the combinations of bolts and nuts (e.g., lock nuts) and bolts, washers and nuts.

As employed herein, the term "finger cluster" or "finger cluster apparatus" refers to a primary disconnect of a circuit breaker expressly including, but not limited to, a primary disconnect of an air circuit breaker (e.g., a DB-50 circuit breaker, previously sold by Westinghouse Electric Corporation of Pittsburgh, Pa.).

Figure 5A:
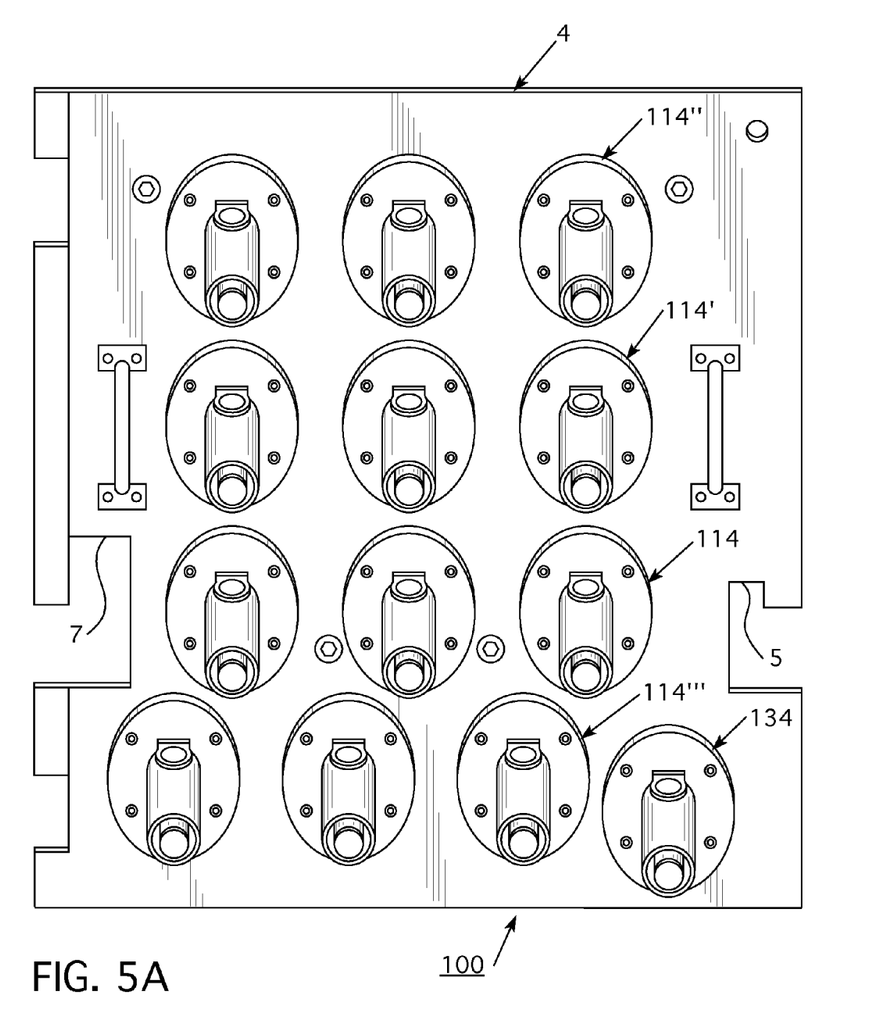
FIGS. 5A-5E are different views of the connection device.
Figure 5B:
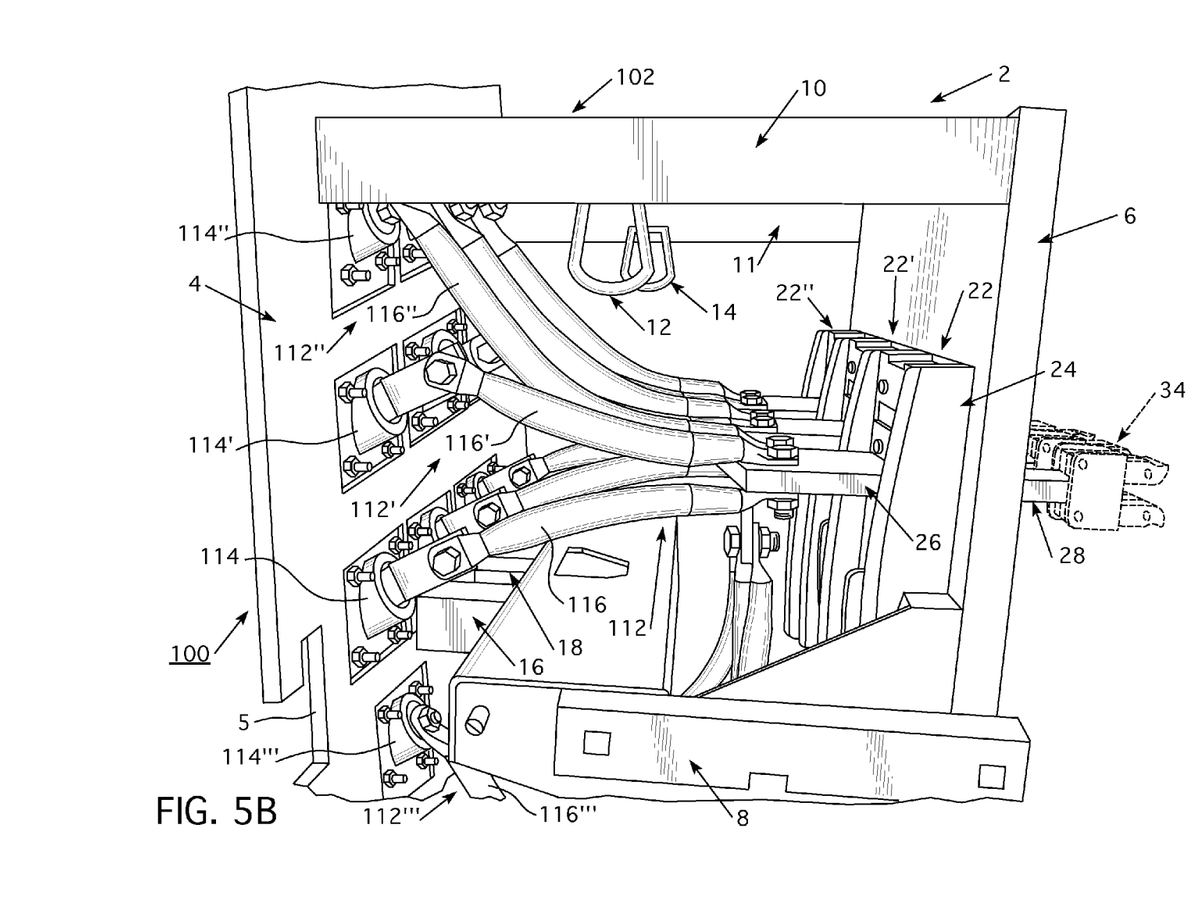
Figure 5C:
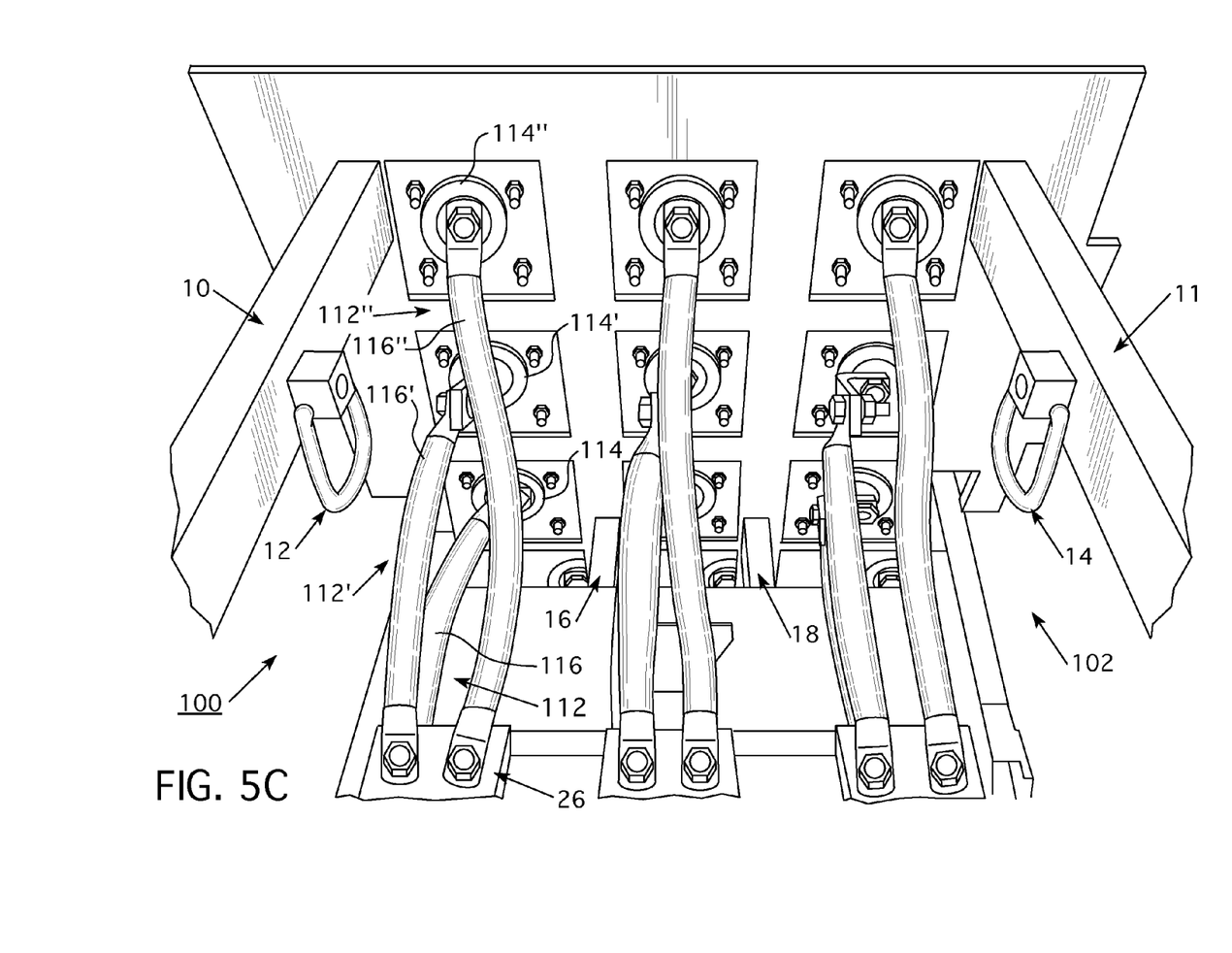
Figure 5D:
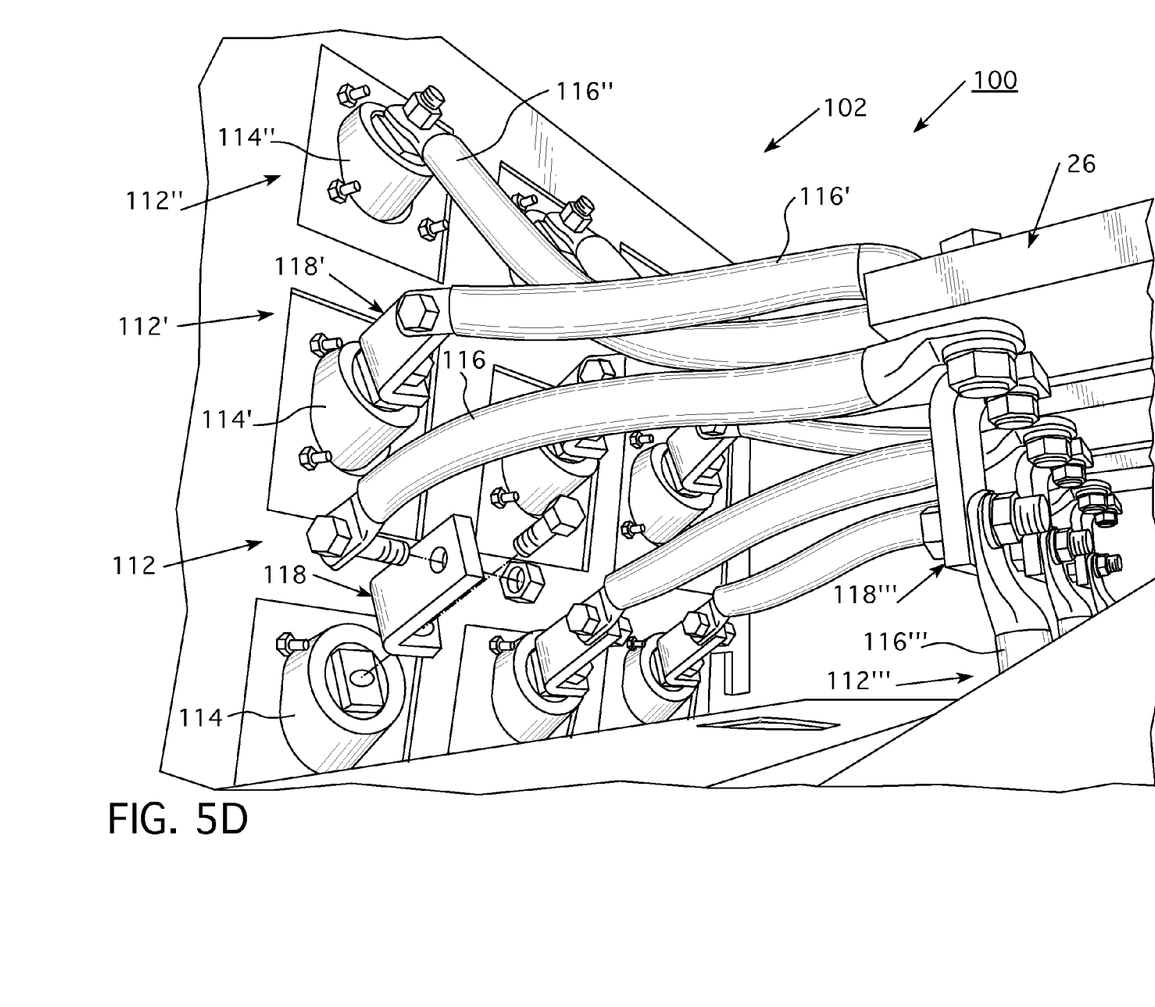
Figure 5E:
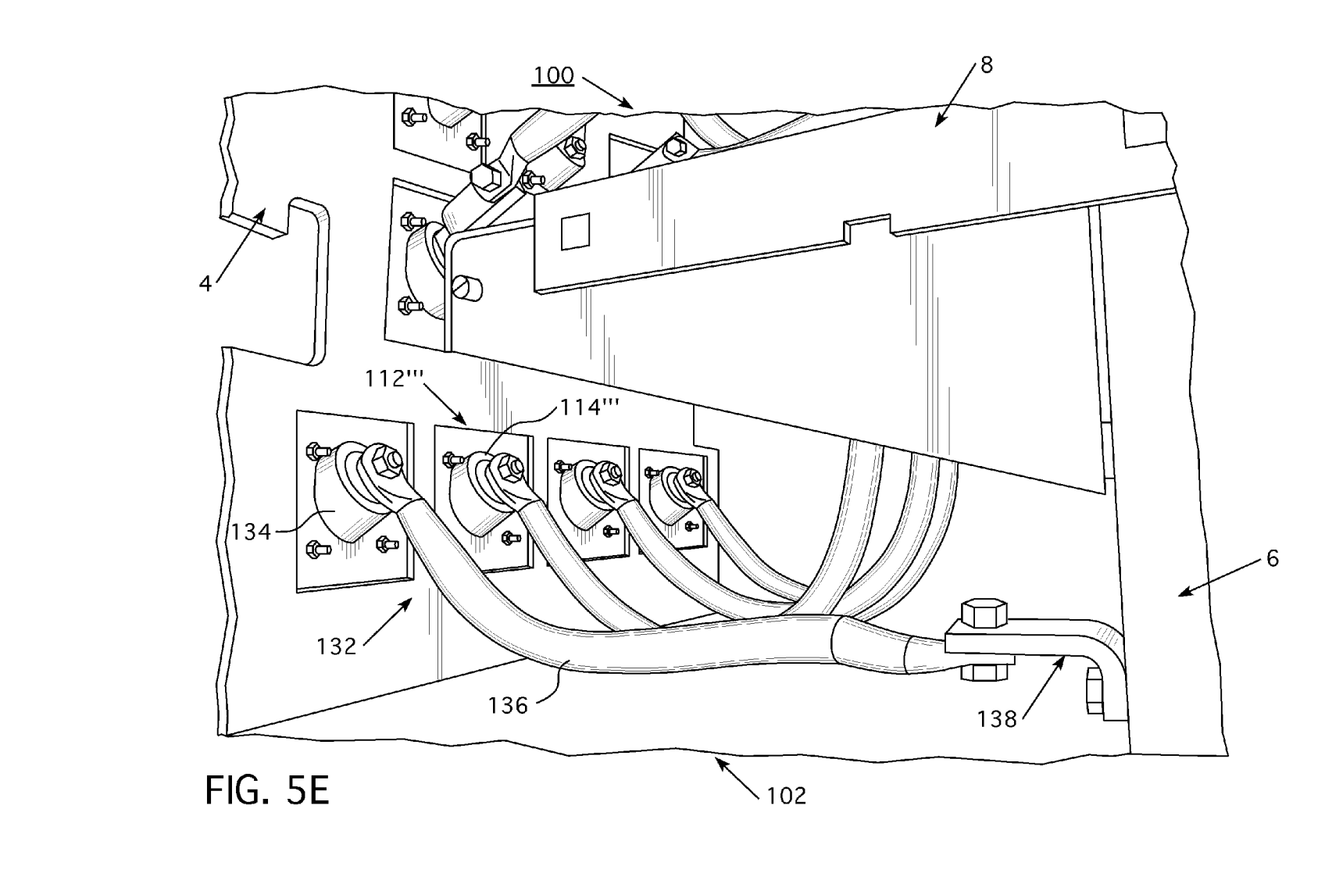
Figure 6:
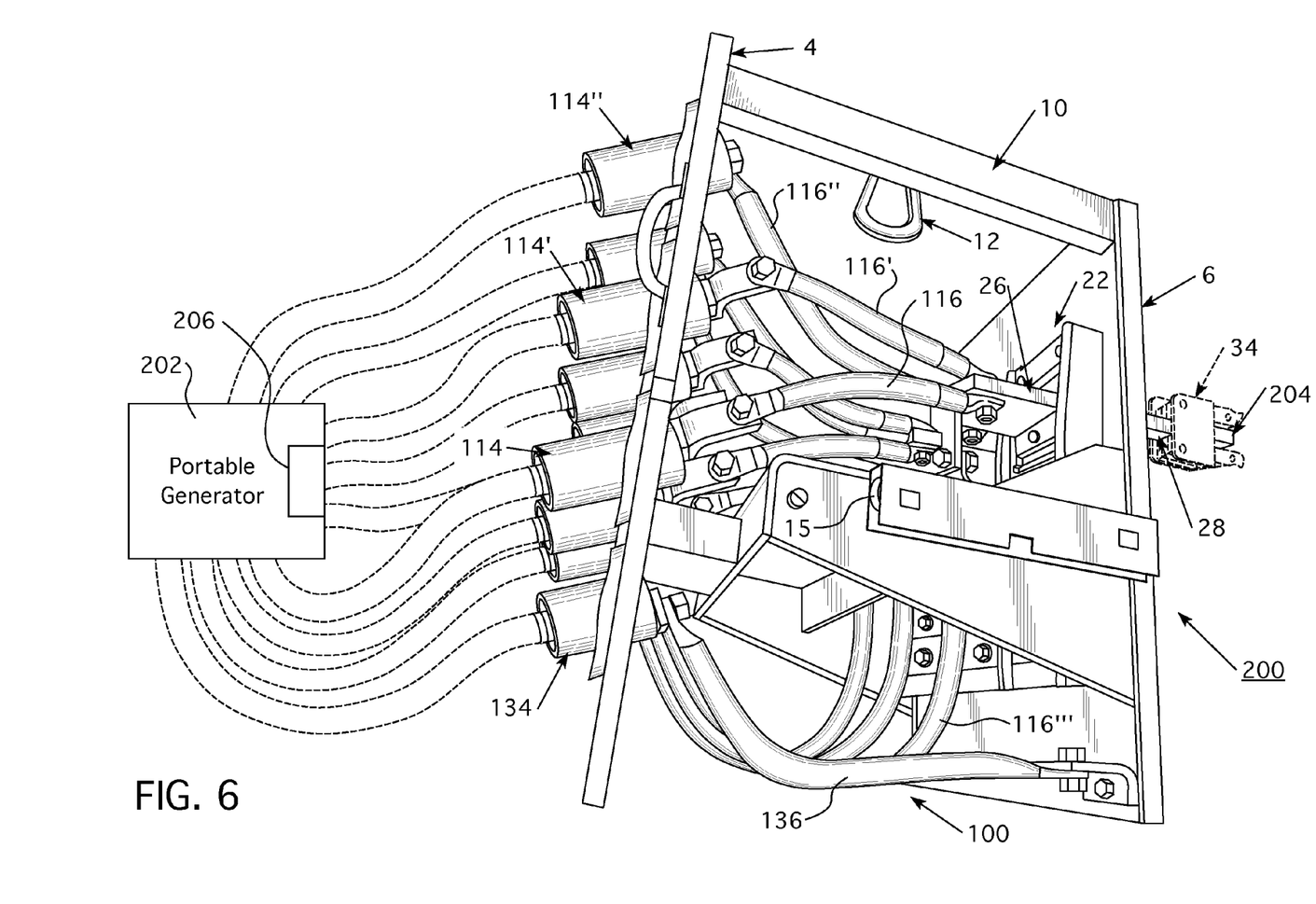
FIG. 6 is an isometric view of the electrical system and connection device therefor.

In accordance with the disclosed concept, a connection device 100 (FIGS. 5A-5E) allows a powering apparatus (e.g., portable generator 202, shown in simplified form in FIG. 6) to supply emergency power to a switchgear bus (e.g., nuclear reactor switchgear bus 204, shown in FIG. 6). As will be discussed in greater detail below, in an emergency situation, such as a natural disaster, an electrical switching apparatus (e.g., a DB-50 circuit breaker, previously sold by Westinghouse Electric Corporation of Pittsburgh, Pa.) may be removed from its cell in a switchgear assembly (not shown) and the connection device 100 (FIGS. 5A-5E) may be installed in the newly vacated cell. Once the connection device 100 (FIGS. 5A-5E) is connected to each of the portable generator 202 (FIG. 6) and the nuclear reactor switchgear bus 204 (FIG. 6), emergency power is advantageously able to be supplied.

Figure 1:
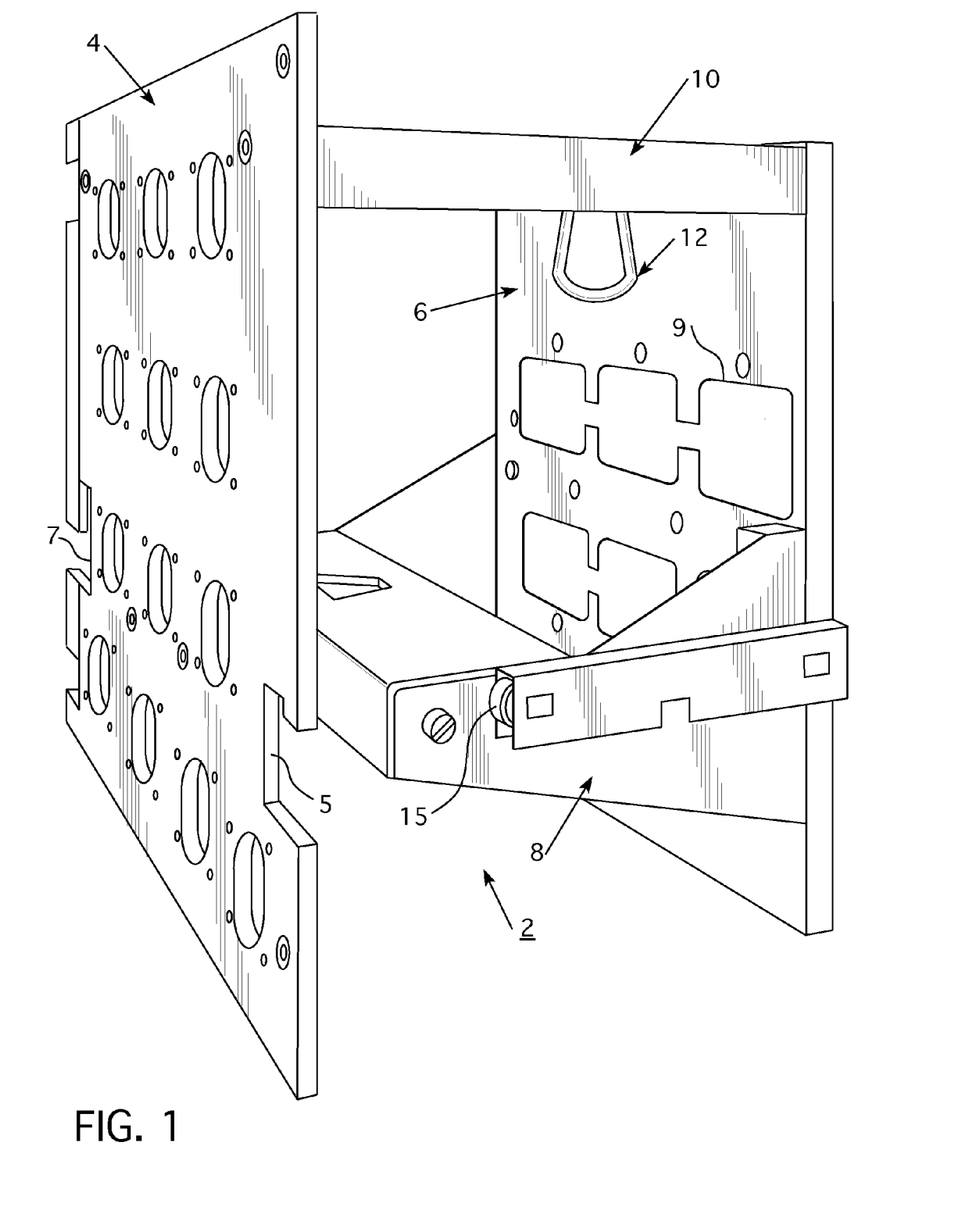
FIG. 1 is an isometric view of a mounting assembly for a connection device of an electrical system, in accordance with an embodiment of the disclosed concept.

FIG. 1 shows a mounting assembly 2 for the connection device 100 (FIGS. 5A-5E), which is part of an electrical system 200 (shown in FIG. 6). The mounting assembly 2 includes a panel 4, a support wall 6 opposite and generally parallel to the panel 4, a platform 8, and a number of brace members 10, (see also brace member 11, shown in FIGS. 5B and 5C). The platform 8 extends from the support wall 6 toward the panel 4. The brace members 10,11 extend from the panel 4 to the support wall 6 and are coupled to both the panel 4 and the support wall 6. Additionally, the support wall 6 has a number of rectangular-shaped edges (one rectangular-shaped edge 9 is indicated in FIG. 1) that each define an opening, the function of which will be described below.

Figure 2:
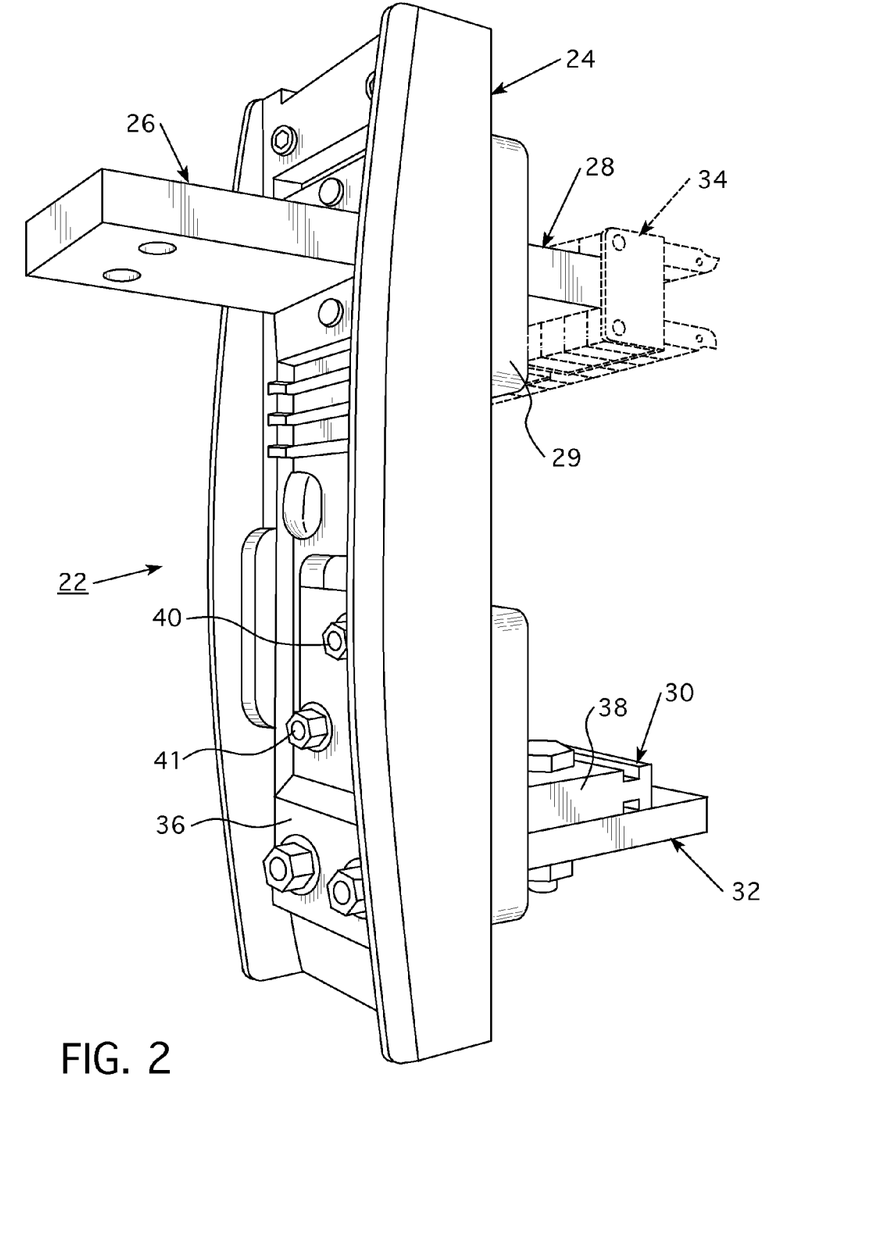
FIG. 2 is an isometric view of base assembly for the connection device.

FIG. 2 shows a base assembly 22 for the connection device 100 (FIGS. 5A-5E). The example base assembly 22 includes a base member 24, a number of stud members 26,28,30, a stabilizer member 32, and a finger cluster apparatus 34 (shown in simplified form in dashed line drawing). The stud members 26,28,30 are each coupled to the base member 24. The first stud member 26 is mechanically coupled and electrically connected to the second stud member 28. More specifically, the first stud member 26 is preferably bolted to the second stud member 28. Additionally, the base member 24 includes a number of rectangular-shaped protrusions (one rectangular-shaped protrusion 29 is indicated). The protrusions 29 are shaped substantially similarly to the edges 9 (FIG. 1) of the support wall 6, and in operation the protrusions 29 each fit in a corresponding opening defined by the edges 9 of the support wall 6. Thus, in addition to being connected to the support wall 6 by coupling members (not indicated), the protrusions 29 and the edges 9 allow the base member 24 to be relatively securely coupled to the support wall 6. Thus, the stud members 26,28,30 are each likewise coupled to the support wall 6.

Figure 3:
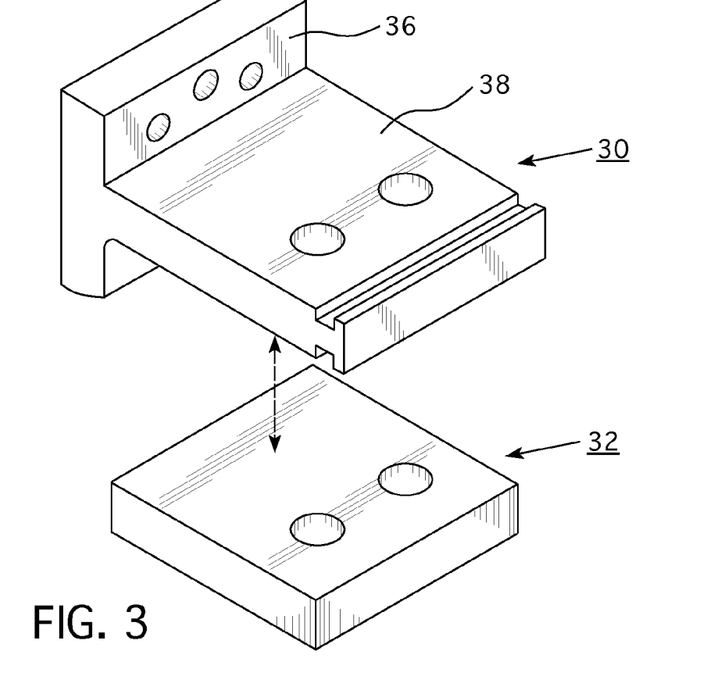
FIG. 3 is an exploded isometric view of a stud member and a stabilizer member for the base assembly.
Figure 4:
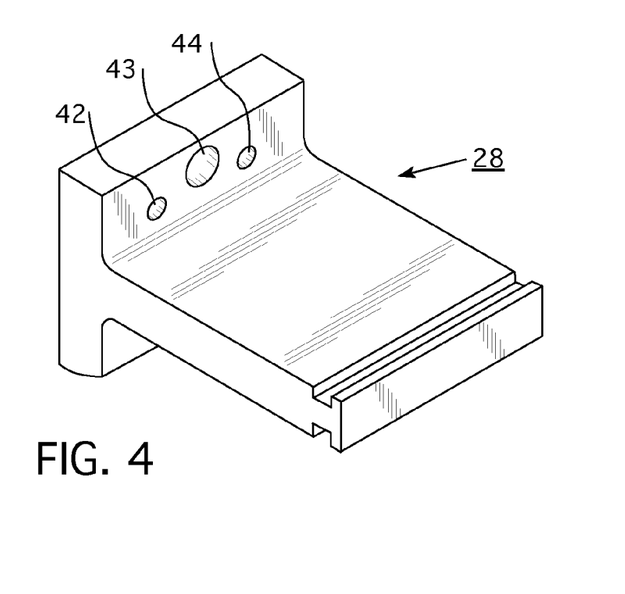
FIG. 4 is an isometric view of an upper stud member for the base assembly.

FIG. 3 shows an exploded view of the third stud member 30 and the stabilizer member 32. As shown, the third stud member 30 includes a mounting portion 36 and an extension portion 38 extending from the mounting portion 36. Referring again to FIG. 2, it will be appreciated that the mounting portion 36 is located on a first side of the base member 24 and the extension portion 38 extends from the mounting portion 36 through the base member 24 to an opposing side. Additionally, the extension portion 38 substantially overlays the stabilizer member 32. Furthermore, the base assembly 22 includes a number of access barrier members (two access barrier members 40,41 are shown and indicated), the function of which will be described in greater detail below. As shown in FIG. 4, the example second stud member 28 includes a number of thru holes (three thru holes 42,43,44 are shown and indicated) that allow the second stud member 28 to be coupled to the base member 24 (FIG. 2).

FIGS. 5A-5E show different views of the connection device 100. As shown in FIG. 5B, the connection device 100 includes an electrical transfer assembly 102, the mounting assembly 2, the base assembly 22, and a number of other base assemblies 22',22". It will be appreciated that the base assemblies 22',22" are substantially the same as the base assembly 22. Furthermore, the electrical transfer assembly 102 provides a pathway for electricity to flow from the portable generator 202. More specifically, the electrical transfer assembly 102 includes a number of interconnect assemblies 112,112',112",112''' and a ground contact assembly 132 (FIG. 5E). As will be discussed below, each interconnect assembly 112,112',112",112''' and the ground contact assembly 132 (FIG. 5E) includes a respective interconnect member and a respective cable.

For ease of illustration and economy of disclosure, the electrical transfer assembly 102 will only be described in association with the interconnect assemblies 112,112',112", 112''', although it will be appreciated that the electrical transfer assembly 102 further includes eight additional interconnect assemblies (shown but not indicated) that are configured substantially the same as the interconnect assemblies 112,112',112",112'''. Accordingly, the electrical transfer assembly 102 includes thirteen respective interconnect members (five interconnect members 114,114',114",114''', 134 are indicated in FIG. 5A) and thirteen respective cables (four cables 116,116',116",116''' are indicated in FIG. 5B), although it will be appreciated that any suitable alternative number and/or configuration of interconnect members/ cables (not shown) may be employed in order to perform the desired function of providing an electrical pathway for the portable generator 202 (FIG. 6). Additionally, although the connection device 100 includes the base assemblies 22',22", for ease of illustration and economy of disclosure, the connection device 100 will only be described in association with the base assembly 22. However, it will be appreciated that the eight additional interconnect assemblies (shown but not indicated) interact with the mounting assembly 2 and the respective base assemblies 22',22" in the same manner in which the interconnect assemblies 112,112',112",112''' interact with the mounting assembly 2 and the base assembly 22.

Continuing to refer to FIG. 5B, the interconnect assembly 112 includes a load interconnect member 114 and a cable 116. The first stud member 26 extends from the base member 24 toward the load interconnect member 114 while the second stud member 28 and the third stud member 30 (FIG. 2) extend from the base member 24 away from the load interconnect member 114. The load interconnect member 114 is coupled to the panel 4 and the cable 116. The cable 116 is coupled to the first stud member 26, and therefore electrically connects the load interconnect member 114 to the first stud member 26. Because the first stud member 26 is bolted to the second stud member 28, and because the second stud member 28 is connected to the finger cluster apparatus 34, the load interconnect member 114 is advantageously electrically connected to the finger cluster apparatus 34. It will be appreciated that the interconnect assemblies 112',112",112''' likewise include a respective load interconnect member 114',114",114''' coupled to the panel 4 and coupled to a respective cable 116',116",116'''. Therefore, the load interconnect members 114',114",114''' and the cables 116',116",116''' are each electrically connected to the first stud member 26, and thus the finger cluster apparatus 34.

The mounting assembly 2 further includes a number of hooks (two hooks 12,14 are shown and indicated in FIGS. 5B and 5C) and a number of mounting members (two mounting members 16,18 are shown and indicated in FIGS. 5B and 5C). The hooks 12,14 are each coupled to a corresponding one of the brace members 10,11. In operation and as will be discussed in greater detail below, the hooks 12,14 support the connection device 100 when the connection device 100 is lifted. The mounting members 16,18 extend from the panel 4 toward the platform 8 and are coupled to each of the panel 4 and the platform 8. In this manner, the mounting members 16,18 and the platform 8 stabilize the connection device 100. Stated differently, the panel 4 and the support wall 6 each provide significant torque on the connection device 100 when the connection device 100 is lifted about the hooks 12,14. By employing the platform 8 and the mounting members 16,18, the stress on the brace members 10,11 is significantly reduced.

Referring to FIG. 5D, the interconnect assemblies 112, 112' each further include a respective L-shaped bracket member 118 (shown exploded for purposes of illustration), 118'. As shown, the bracket members 118,118' each have apertures that allow them to be coupled to the respective load interconnect members 114,114' and the respective cables 116,116'. In operation, the bracket members 118,118' advantageously allow the respective cables 116,116' to be coupled to the respective load interconnect members 114, 114' without any undesirable bending. Additionally, the interconnect assembly 112''' (partially shown in FIG. 5D) further includes an L-shaped bracket member 118''' coupled to each of the cable 116''' and the first stud member 26. Providing a similar benefit as the bracket members 118,118', the bracket member 118''' advantageously allows the cable 116''' to be coupled to the first stud member 26 without any undesirable bending. It will further be appreciated that each of the load interconnect members 114,114',114'',114''' extends through the panel 4 and is at an angle of between 25 degrees and 65 degrees with respect to the panel 4, advantageously allowing the load interconnect members 114,114', 114'',114''' to be coupled to the respective cables 116,116', 116'',116''' without any undesirable bending.

As shown in FIG. 5E, the ground contact assembly 132 includes a ground interconnect member 134, a cable 136, and an L-shaped bracket member 138. The ground interconnect member 134 is coupled to the panel 4 and extends through the panel 4. The ground interconnect member 134 is at an angle of between 25 degrees and 65 degrees with respect to the panel 4, advantageously allowing the cable 136 to be coupled to the ground interconnect member 134 without any undesirable bending. The cable 136 is coupled to each of the ground interconnect member 134 and the bracket member 138. The bracket member 138 is coupled to the cable 136 and the support wall 6. Providing a similar benefit as the bracket members 118,118',118''', the bracket member 138 advantageously allows the cable 136 to be coupled to the support wall 6 without any undesirable bending.

FIG. 6 shows an isometric view of the electrical system 200, which includes the connection device 100, the portable generator 202, the nuclear reactor switchgear bus 204, and an electrical switching apparatus (e.g., circuit breaker 206, shown in simplified form coupled to the portable generator 202). The portable generator 202 is electrically connected to each of the load interconnect members 114,114',114'',114''' (FIGS. 5A-5B and 5E), the eight additional load interconnect members (not indicated), and the ground interconnect member 134. The finger cluster apparatus 34 and the respective finger cluster apparatus (FIG. 5B) of the base assemblies 22',22'' (FIG. 5B) are each mechanically connected and electrically connected to the nuclear reactor switchgear bus 204. Because the first stud member 26 and the second stud member 28 are each electrically connected to each of the load interconnect members 114,114',114'',114''' (FIGS. 5A-5B and 5E) and the nuclear reactor switchgear bus 204 (i.e., via the finger cluster apparatus 34), the portable generator 202 is advantageously electrically connected to the nuclear reactor switchgear bus 204.

In operation, the portable generator 202 is configured to power the nuclear reactor switchgear bus 204. More specifically, in an emergency situation such as a natural disaster, it may be desirable to back feed (i.e., supply power to) the nuclear reactor switchgear bus 204. In such a situation, an electrical switching apparatus (e.g., a DB-50 circuit breaker, previously sold by Westinghouse Electric Corporation of Pittsburgh, Pa.), which is traditionally mechanically connected and electrically connected to the nuclear reactor switchgear bus 204, is removed from its cell in an associated switchgear assembly (not shown). Then a lifting device (not shown) connects to the hooks 12,14 (FIGS. 5B and 5C) of the connection device 100 and advantageously allows the connection device 100 to be supported while being positioned/installed in the newly vacated cell. The finger cluster apparatus 34, and the finger cluster apparatus (not shown) of the base assemblies 22',22'' (FIG. 5B) are then mechanically connected to the nuclear reactor switchgear bus 204, as shown in FIG. 6. It will be appreciated that the connection device 100 (FIGS. 5A-5E) is not an electrical switching apparatus. More specifically, the connection device 100 (FIGS. 5A-5E) is devoid of moving parts and/or components that are typically included within a DB-50 circuit breaker. For example, the connection device 100 is preferably devoid of secondary contact assemblies, operating mechanism assemblies, closing coil assemblies, resistor and capacitor assemblies, lower main contacts, movable contact arms, auxiliary switches, shunt trip attachments, overcurrent trip units, direct trip actuators, control relays, current sensors, under-voltage trip attachments, front panels, lifting brackets, and associated mounting hardware.

For this reason, the electrical system 200 further includes the circuit breaker 206, which is coupled to the portable generator 202. Once the portable generator 202 is electrically connected to each of the load interconnect members 114,114',114'',114''' (FIGS. 5A-5B and 5E) and the ground interconnect member 134, the portable generator 202 is turned on and back feeds (i.e., supplies power to) the nuclear reactor switchgear bus 204. Thus, in a critical situation, emergency power is quickly and easily able to be supplied to the nuclear reactor switchgear bus 204.

Referring again to FIG. 1, the panel 4 has a number of cutout portions 5,7, and the mounting assembly 2 has a number of wheels (one wheel 15 is shown and indicated). It will be appreciated that when the connection device 100 is installed in the cell of the switchgear assembly (not shown), the cutout portions 5,7 allow for rails (not shown) to pass through the panel 4 and the wheels 15 and rest on opposing rails (not shown) in the cell, and thus advantageously provide a relatively secure location on which the weight of the connection device 100 can be supported. Referring again to FIG. 2, it will be appreciated that the stabilizer member 32 and the associated stabilizer members of the base assemblies 22',22'' (FIG. 5B) advantageously prevent the finger cluster apparatus 34 and the associated finger cluster apparatus of the base assemblies 22',22'' (FIG. 5B) from being overstressed when connected to the nuclear reactor switchgear bus 204 (FIG. 6). Continuing to refer to FIG. 2, the access barrier members 40,41 advantageously prevent inadvertent access to the potentially energized nuclear reactor switchgear bus 204 (FIG. 6).

Accordingly, it will be appreciated that the disclosed concept provides for an improved (e.g., reliable mechanism and method to supply emergency power) electrical system 200, and connection device 100 and method of powering a switchgear bus 204 in an electrical system 200 therefor, which among other benefits, quickly and easily allows emergency power to be supplied to a switchgear bus 204 in a critical situation, such as a natural disaster.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A connection device for an electrical system, said electrical system comprising a powering apparatus, an electrical switching apparatus, and a switchgear bus, said electrical switching apparatus being coupled to said powering apparatus, said connection device comprising:
a mounting assembly comprising a panel and a support wall opposite, parallel to, and spaced from said panel;
an electrical transfer assembly comprising:
a number of interconnect assemblies each comprising a load interconnect member extending through said panel, said load interconnect member being coupled to said panel and structured to be electrically connected to said powering apparatus; and
a number of base assemblies each comprising:
a number of stud members each coupled to said support wall,
wherein at least one of said number of stud members is electrically connected to said load interconnect member and structured to be electrically connected to said switchgear bus.

2. The connection device of claim 1 wherein each of said base assemblies further comprises a base member coupled to said support wall; wherein said at least one of said number of stud members comprises a first stud member and a second stud member each coupled to said base member; wherein said first stud member is electrically connected to said second stud member; wherein said first stud member extends from said base member toward said load interconnect member; and wherein said second stud member extends from said base member away from said load interconnect member.

3. The connection device of claim 2 wherein each of said base assemblies further comprises a third stud member and a stabilizer member connected to said third stud member; wherein said third stud member comprises a mounting portion and an extension portion; wherein the extension portion extends from the mounting portion through said base member; and wherein the extension portion substantially overlays said stabilizer member.

4. The connection device of claim 2 wherein said first stud member is bolted to said second stud member; wherein each of said base assemblies further comprises a finger cluster apparatus connected to said second stud member; and wherein said finger cluster apparatus is structured to be mechanically connected to said switchgear bus.

5. The connection device of claim 2 wherein each of said number of interconnect assemblies further comprises a cable; and wherein said cable is mechanically coupled and electrically connected to each of said load interconnect member and said first stud member.

6. A connection device for an electrical system, said electrical system comprising a powering apparatus, an electrical switching apparatus, and a switchgear bus, said electrical switching apparatus being coupled to said powering apparatus, said connection device comprising:
a mounting assembly comprising a panel and a support wall opposite said panel;
an electrical transfer assembly comprising:
a number of interconnect assemblies each comprising a load interconnect member, said load interconnect member being coupled to said panel and structured to be electrically connected to said powering apparatus; and
a number of base assemblies each comprising:
a number of stud members each coupled to said support wall,
wherein at least one of said number of stud members is electrically connected to said load interconnect member and structured to be electrically connected to said switchgear bus; wherein each of said base assemblies further comprises a base member coupled to said support wall; wherein said at least one of said number of stud members comprises a first stud member and a second stud member each coupled to said base member; wherein said first stud member is electrically connected to said second stud member; wherein said first stud member extends from said base member toward said load interconnect member; wherein said second stud member extends from said base member away from said load interconnect member; wherein each of said number of interconnect assemblies further comprises a cable; wherein said cable is mechanically coupled and electrically connected to each of said load interconnect member and said first stud member; wherein at least one of said number of interconnect assemblies further comprises an L-shaped bracket member; and wherein said L-shaped bracket member is connected to each of said cable and said load interconnect member.

7. The connection device of claim 5 wherein said number of interconnect assemblies comprises a first interconnect assembly, a second interconnect assembly, a third interconnect assembly, and a fourth interconnect assembly.

8. The connection device of claim 7 wherein said number of base assemblies comprises a first base assembly, a second base assembly, and a third base assembly.

9. The connection device of claim 1 wherein said electrical transfer assembly further comprises a ground contact assembly; wherein said ground contact assembly comprises a ground interconnect member, a cable, and an L-shaped bracket member; wherein said ground interconnect member is coupled to said panel and structured to be electrically connected to said powering apparatus; wherein said L-shaped bracket member is coupled to said support wall; and wherein said cable is connected to each of said ground interconnect member and said L-shaped bracket member.

10. The connection device of claim 1 wherein said mounting assembly further comprises a number of brace members; wherein each of said brace members extends from said panel to said support wall; and wherein each of said brace members is coupled to each of said panel and said support wall.

11. The connection device of claim 10 wherein said number of brace members comprises a first brace member and a second brace member; wherein said mounting assembly further comprises a first hook and a second hook; wherein said first hook is coupled to said first brace member; and wherein said second hook is coupled to said second brace member.

12. The connection device of claim 11 wherein said mounting assembly further comprises a platform and a number of mounting members; wherein said platform extends from said support wall toward said panel; wherein each of said mounting members extends from said panel toward said platform; and wherein each of said mounting members is coupled to said platform.

13. The connection device of claim 1 wherein said connection device is not an electrical switching apparatus.

14. An electrical system comprising:
a powering apparatus;
an electrical switching apparatus coupled to said powering apparatus;
a switchgear bus; and
a connection device comprising:
 a mounting assembly comprising a panel and a support wall opposite, parallel to, and spaced from said panel,
 an electrical transfer assembly comprising:
  a number of interconnect assemblies each comprising a load interconnect member extending through said panel, said load interconnect member being coupled to said panel and electrically connected to said powering apparatus, and
  a number of base assemblies each comprising:
   a number of stud members each coupled to said support wall,
 wherein at least one of said number of stud members is electrically connected to each of said load interconnect member and said switchgear bus.

15. The electrical system of claim 14 wherein said powering apparatus is a portable generator; and wherein said switchgear bus is a nuclear reactor switchgear bus.

16. The electrical system of claim 15 wherein each of said base assemblies further comprises a base member coupled to said support wall; wherein said at least one of said number of stud members comprises a first stud member and a second stud member each coupled to said base member; wherein said first stud member is electrically connected to said second stud member; wherein said first stud member extends from said base member toward said load interconnect member; wherein said second stud member extends from said base member away from said load interconnect member; wherein each of said base assemblies further comprises a finger cluster apparatus connected to said second stud member; and wherein said finger cluster apparatus is mechanically connected to said nuclear reactor switchgear bus.

17. The electrical system of claim 16 wherein said number of interconnect assemblies comprises a first interconnect assembly, a second interconnect assembly, a third interconnect assembly, and a fourth interconnect assembly; and wherein said number of base assemblies comprises a first base assembly, a second base assembly, and a third base assembly.

* * * * *